United States Patent [19]
Kochanneck

[11] Patent Number: 5,241,875
[45] Date of Patent: Sep. 7, 1993

[54] MULTIBLOCK-ROBOT

[76] Inventor: Uwe Kochanneck, Im Spähenfelde 25, 44145 Dortmund, Fed. Rep. of Germany

[21] Appl. No.: 760,452

[22] Filed: Sep. 16, 1991

[30] Foreign Application Priority Data

Sep. 24, 1990 [DE] Fed. Rep. of Germany ....... 4030119

[51] Int. Cl.⁵ .................... B25J 17/00; B25J 18/00
[52] U.S. Cl. .................... 74/479 BP; 74/479 BE; 180/8.6; 310/112; 446/90; 446/91; 901/1; 901/15; 901/23; 901/28
[58] Field of Search ............ 74/479, 479 BP, 479 BE; 901/1, 15, 23, 28, 29; 180/8.6; 446/90, 91; 310/112

[56] References Cited

U.S. PATENT DOCUMENTS

| | | | |
|---|---|---|---|
| 4,370,091 | 1/1983 | Gagliardi | 414/735 |
| 4,641,251 | 2/1987 | Inoue | 180/8.6 X |
| 4,684,312 | 8/1987 | Antoszewski | 901/29 X |
| 4,738,583 | 4/1988 | Macconochie et al. | 901/1 X |
| 4,766,775 | 8/1988 | Hodge | 74/479 |
| 4,973,215 | 11/1990 | Karlen et al. | 74/479 |
| 4,988,259 | 1/1991 | Gabillet | 74/479 X |
| 5,040,626 | 8/1991 | Paynter | 901/1 X |

FOREIGN PATENT DOCUMENTS 0153884 9/1985 European Pat. Off. .............. 901/28
1220780 3/1986 U.S.S.R. .

Primary Examiner—Allan D. Herrmann

[57] ABSTRACT

A robot system with robot specific effects. Reconstructable for other fields of activities with few manipulations by the users themselfs. This objective is achieved in accordance with the present invention by standard robot-block parts of nearly the similar design for the installation of multiblock-robots with self operating walk, drive and manipulation faculties, with horizontally and vertically fitting, rotation flange plug connections, with turntables and driving motors and with current and communication channels which are leading through the center of the rotation plug connections and which provide current and communication supply lines and current and communication control lines. These lines are leaded to inside and outside slip-ring and induction units and to equipment components, composed of accumulators, sensors and electronic boards inside the block chamber. The multiblock-robots achieve only by rotary power and in accordance with the individual plug connection installations, variable manipulations, locomotions and walk-movements, with multi-axis free-motion efficiency, for the most different user applications and objectives.

8 Claims, 9 Drawing Sheets

Fig. 1

(equipment component for constant power supply)

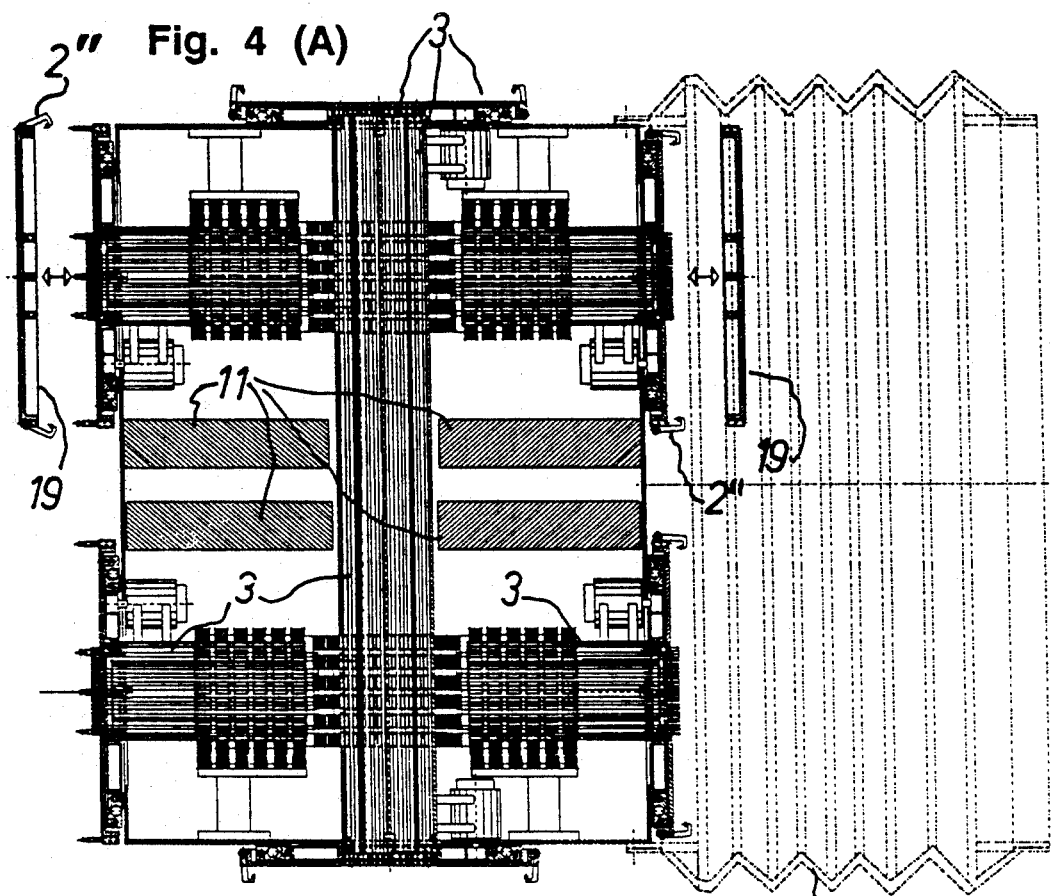
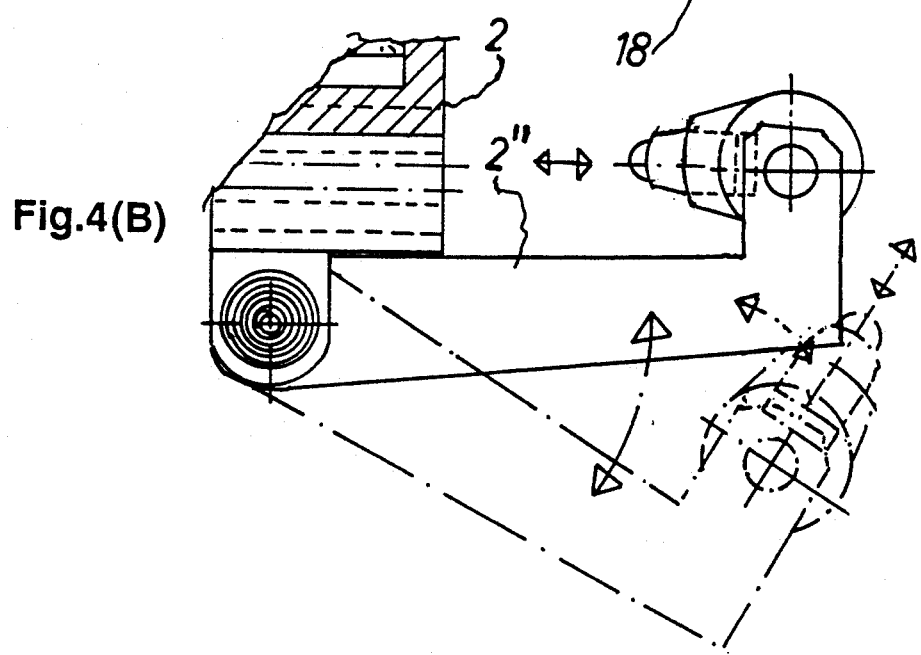

Fig. 8 (A) (remote control component)

Fig. 8 (C) (speech control and speech reproduction module)
(sensors for position orientation)
(monitor)
(discette and disc storage unit)
(sensors for position orientation)
(sensors for image recognition)

(monitor)
(local control)
(mini computer)
(keyboard)

MULTIBLOCK-ROBOT

BACKGROUND OF THE INVENTION

This application relates to a robot system with robot specific effects. Robots are known as compact constructions of composed welded and screwed basic unit assembly groups with electromechanical and hydraulic components for multi-axis application. The multi-axis free-motion efficiency is achieved by the most different rotary drives, linear drives, gear boxes, belt wheels, clutch bars and rope tools correspondingly adapted with jacket casings. The development and design of these robots for specific automation purposes is relatively laborious. They are moreover relatively unflexible for adaptations to changings in the field of user applications.

SUMMARY OF THE INVENTION

It is an object of the present invention to provide robots of the above mentioned kind which can be used with minimal expenditure of development and construction and which can be reconstructed with few manipulations for other fields of user activities.

These objects are attained according to the present invention by combining various standard robot-block-parts of nearly the same design with self operating walk, drive and manipulating faculties with horizontally and vertically dimension-fitting rotation-flange plug connections, where every rotation-flange plug connection is provided with engaging plugs and engaging spring-loaded clamp levers and having a turntable with driving motor and with current and communication channels for current, supply, control and communication conducters in the center line, guiding to inner and outer slip ring and induction bodies and to further rotation-flange plug connections, to drive motors and in accordance with the user intention, to built-in equipment, composed of accumulators, sensors, electronic boards within the robot-block chambers, where the current and supply lines are guided to plug units with plug connections and plug sleeves provided at the end of every current and communication channel, where the rotation-flange plug connection with center line current and communication channel is rotated to the center axis by means of the driving motors whereas the block chamber itself is not rotated; where the rotation-flange plug connection with the current and communication channel is not rotated and only the block chamber is rotated; where the rotation-flange plug connection with the current and communication channel together with the block chamber is rotated by means of the rotation-flange of an adjacent standard robot-block-part, or only the rotation-flange plug connection with current and communication channel is rotated by means of the rotation-flange of an adjacent standard robot-block-part and the block chamber itself is not rotated; where from one rotation-flange plug connection to the next rotation-flange plug connection a multi-block robot assembly is put together by means of the centering effect of the engaging plugs, the clamping effect of the spring-loaded clamp levers, the contact closing between the plug connection units and the plug sleeve units of one standard robot-block part with the other and where only by rotary power, variable manipulations and locomotions with multi-axis free-motion efficiency can be provided, by means of the turntables and the driving motors, in accordance with the assembled standard robot-block parts put together for the most different user application purposes.

This arrangement is, indeed, is a considerable improvement over the prior-art system, that only by the variation of any given arrangement of standard robot-block parts to each other and the exchange of connections of the most different rotation-flange plug connections per standard robot-block, a high number of combination possibilities is attainable with different addition of motions and efficacy of power in the end members of the robot-block. Thus, the creation of new types of robots can be achieved by means of the exchange, rotation and newly flangeing of standard robot-block parts. Furthermore, an unexpensive system simplification is attained by means of only rotation movement application for all standard robot-block parts and substitution of hydraulics, straight line mechanical shear rods, chain and belt drives, by means of drive motors and turntables, largely of nearly the same design, where the current and communication transmission is coordinated and always central guided through the rotation-flange plug connection with no hindering the free motion of the robot by outer and innercables and conductions or other control means. The standard robot block-parts can be checked and programmed separately and further development can be limited to the development of standard robot block-parts instead of total robots. Under comparable performance, the robot block-parts can be of smaller design and are cost efficient in production by the high number of similar standard robot-block-parts. The users can attain new robot effects by the fast plug connection rearrangement and he can fastly achieve the adaption of the multi-block robot to new function principles and automatic procedures. Particular user requests which can not be realised by the available set of standard robot-block parts of a present multi-block robot, can be achieved by the exchange or addition of further standard robot-block parts of a specific effect, by disconnecting and newly plug in of the rotation-flange plug connection.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a section along the vertical center of a standard robot-block part with two horizontal rotation-flange plug connections;;

FIG. 4(A) is a section along the vertical center of a standard robot-block part with two horizontal and four vertical rotation-flange plug connections;

FIG. 4(B) is a detail of the spring-loaded clamp levers of FIG. 4(A) with dashdot lines for open position and continuous lines for clamp position;

DESCRIPTION OF THE PREFERED EMBODIMENTS

Figure 1:
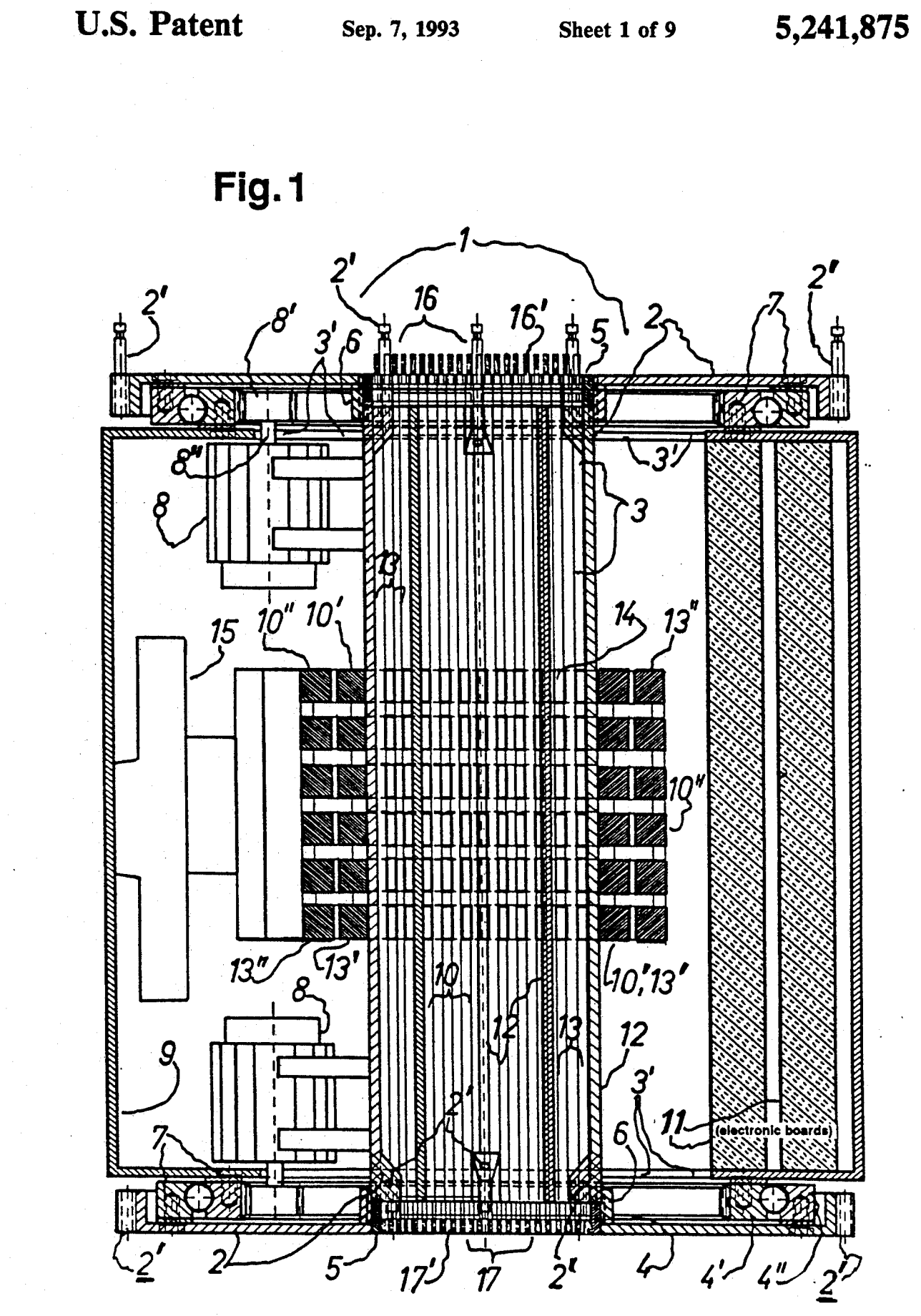
Figure 2:
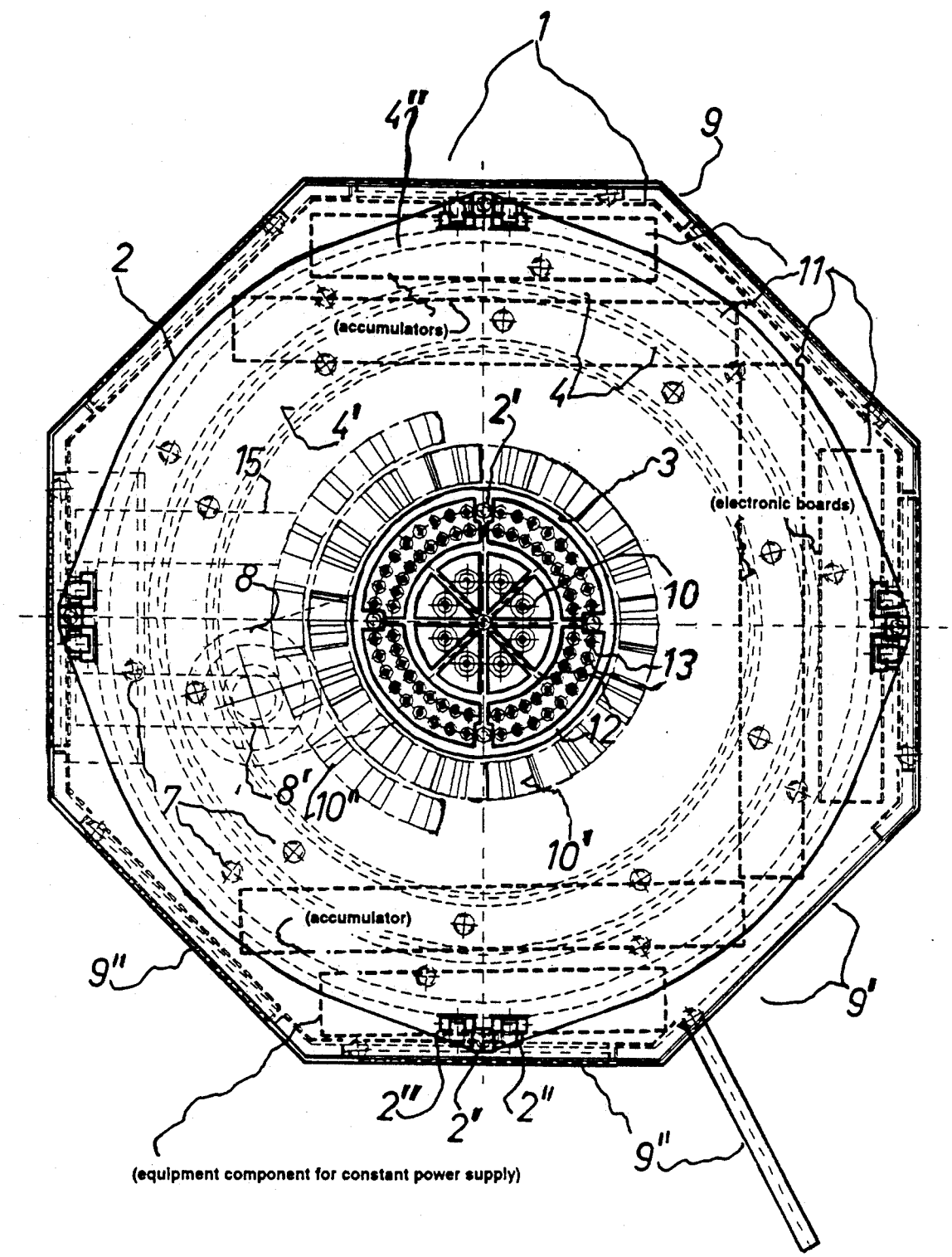
FIG. 2 is a top view of a standard robot-block part of FIG. 1.

The arrangement shown in FIGS. 1 and 2 has a standard robot-block part 1 which provides always at least one vertical and one horizontal current and communication channel 3 within the standard robot-block part 1 and which has two vertical or horizontal rotation-flange plug connections 2, tightly screwed at the ends of the current and communication channels 3 by means of ring nuts 5 and 6. Every rotation-flange plug connection 2 is tightly screwed with a turntable 4 either at the inside ring 4' or at the outside ring 4" by the turntable clamping bolts 7. The inside ring 4' is provided with a gear rim at which is engaged the driving gear 8' of the driving motor 8. At the wall of the block chamber 9, near to the end opening of the current and communication channel 3, is provided a passage opening 3' for the free passing through of the current and communication channels 3 and of the driving gear 8' with driving shank 8". The block chamber 9 is tightly screwed with the clamping bolts 7 either with the inside ring 4' or with the outside ring 4". If the block chamber 9 is screwed with the inside ring 4', the outside ring 4" is screwed with the rotation-flange plug connection 2 and the driving motor 8 is fixed at the outside wall of the current and communication channel 3. The driving motor 8 now achieves that the block chamber 9 rotates around the center line of the rotation-flange plug connection 2 whereas the rotation-flange plug connection 2 and the current and communication channel 2 is not rotated. If the block chamber 9 is screwed with the outside ring 4", the inside ring 4' is screwed with the rotation-flange plug connection 2 and the driving motor 8 is fixed with the inside wall of the block chamber 9. The driving motor 8 now achieves that the rotation-flange plug connection 2 with the current and communication channel 3 rotates around the center line of the rotation-flange connection 2 and the block chamber 9 itself is not rotated. At the flange peripherie of the rotation-flange plug connections 2 and at the center of the current and communication channel 3 are provided engaging plugs 2', plug sleeves 2' and spring-loaded clamp levers 2". The block chamber 9 has at its outside walls 9' access openings 9' for maintanance purposes and access to the equipment inside the block-chamber 9. The access openings 9' are locked by the rotary flap 9". The current and communication channel 3 leads the current and supply lines 10 from and to the driving motors 8 and from and to the equipment components 11, through the core of the current and communication channel 3, which is manifold shielded against the outside ring by separation walls 12. The outside ring of the current and communication channel core has also separation walls 12 and is shielded against the core and against the own peripherie. Within outside ring are conducted communication and control lines 13 for control and impuls transmission from and to the driving motors 8 and the equipment components 11, inside the block chamber 9. The current and supply lines 10 are leaded through exit openings 14, which are provided in the walls of the current and communication channel 3, to ring shaped inner slip-ring and induction units 10'. The communication and control lines 13 are likewise leaded through the exit openings 14 to ring shaped slip-ring and induction units 13'. The inner slip-ring and induction unit 10',13' is rigidly fixed with the separation walls 12 of the current and communication channel 3. The outer slip-ring and induction unit 10",13" is rigidly fixed with the block chamber 9 by the slip-ring and induction support unit 15. The equipment components 11 inside the block chamber 9 are composed by accumulators sensor elements, electronic boards, for control of the standard robot-block parts 1 in accordance with the user intention of the total multi-block robot and by further control equipment-components 11 which through the access openings 9 can always be exchanged and serviced. The current and supply lines 10 and the communication and control lines 13 are partly conducted without junction to the exit openings 14, from the bottom to the top side of the of the horizontal rotation-flange plug connection. The top sided horizontal rotation flange plug connection 2 has a plug-unit 16 with a number of plug contacts 16', in accordance with the number of the current and supply lines 10 and communication and control lines 13 to be connected. A part of the current and supply lines 10 is leading from the plug sleeve unit to the exit openings 14 and to the equipment components 11 into the block chamber 9. In accordance with the user intentions for the standard robot-block part 1, a further part of current and supply lines 10 and of communication and control lines 13 is then conducted from the inner block chamber 9 to the outer slip-ring and induction unit 10",13", the inner slip-ring and induction unit 10',13', through the exit openings 14 into the current and communication channel 3 up to the plug unit 16 and the plug contacts 16' or up to the opposite plug sleeve unit 17 with plug sleeves 17'.

Figure 3:
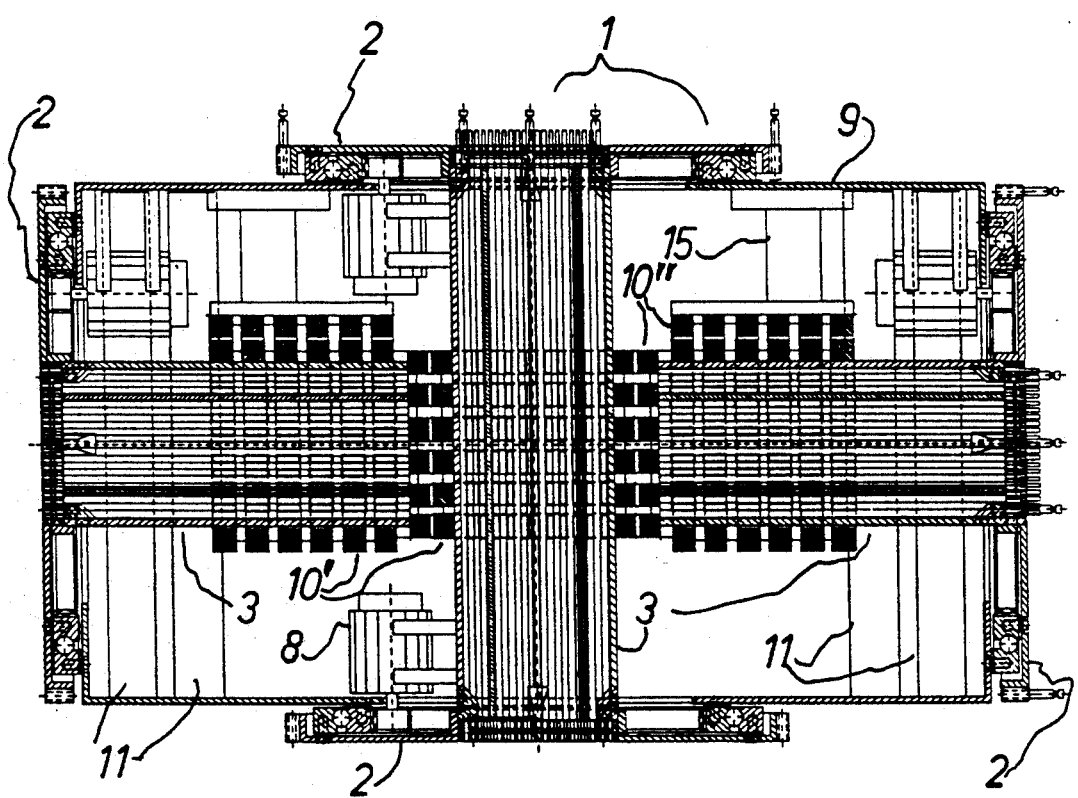
FIG. 3 is a section along the vertical center of a standard robot-block part with two horizontal and four vertical rotation-flange plug connections.

Each of the vertical rotation-flange plug connections 2 of the standard-robot block part 1, shown in FIG. 3, is screwed with a horizontal current and communication channel 3 which leads to the vertical current and communication channel 3 of the horizontal rotation flange plug connection 2 and ends there. The driving motors 8 of the vertical rotation-flange plug connection 2 are fixed at the block chamber 9. The inner ring 4' is solidly screwed by the clamping bolts 7 at the rotation-flange plug connection 2. The outer ring 4" solidly screwed by the clamping bolts 7 at the at the block chamber 9. The driving motor 8 of the left horizontal rotation-flange plug connection 2 rotates only the rotation-flange plug connection 2 on the left side, while the block chamber 9 it not rotated. Likewise, the driving motor 8 of the right rotation-flange plug connection 2 rotates only the rotation-flange plug connection of the right side with the belonging vertical current and communication channel, which reaches up to the inner slip-ring and induction 10'. For the objective of free rotation, the left sided horizontal current and communication channel 3 of the horizontal rotation-flange plug connection 2 reaches from the plug sleeve unit 17 only up to the inner slip-ring and induction unit 10',13' of the vertical current and communication channel 3 and of the right sided rotation-flange plug connection 2, likewise, from the plug unit 16 up to the inner slip-ring and induction unit 10',13' of the vertical current and communication channel 3. Each of the end parts of the left and right sided current and communication channel 3 which reaches to the center of the block chamber 9 receives an outer and inner slip-ring and induction unit 10". This ring shaped, direction changing enclosing counterpart of the inner slip-ring and induction unit 10' of the vertical current and communication channel 3 provides the transmission of the current and communication impulses between the vertical slip-ring and induction unit 10',13" with the belonging vertical current and communication channel 3 in the center and the both, left and right sided, opposite mounted horizontal slip-ring and induction units 10",13" with the belonging current and communication channels 3. In so far is the central, vertical current and communication channel 3 with its slip-ring and induction unit 10',13', current and communication impuls distributor to the left and to the right side. The separation walls 12 of the both sided left and right current and communication channels 3 are also provided with an inner and outer slip-ring and induction unit 10',13',10",13" and the current and supply lines 10 and communication and control lines 3 are conducted in the current and communication channels 3 through exit openings 14 within the walls of the communication and control lines 3 to the inner slip-ring and induction unit 10',13' and from there to the outer slip-ring and induction unit 10",13" which are supported by the slip-ring and induction support unit 15.

The standard robot-block part 1, shown in FIG. 4(A), has a continuous vertical current and communication channel 3 with two horizontal rotation flange plug connections 2 and four horizontal current and communication channels 3 with four vertical rotation flange plug connections 2. At the left and right side of the top-sided vertical rotation flange plug connections 2 is a covering 19 provided which is pluged in arrow direction at the rotation flange plug connection 2 and covers the current and communication channel 3 with the plug connection unit 16 or with the plug sleeve unit 17, whenever a rotation flange plug connection 2 of a standard robot-block part 1 is not used in connection with a further rotation flange plug connection 2 and is remaining free of a further standard robot-block part 1. Furthermore a sealing is achieved between the rotation flange plug connections 2 by a rotation flexible pleated covering 18, which has been drafted in dash-dot lines. The rotation flexible, pleated covering 18 is screwed at the block chamber 9 and bridges from one standard robot-block part 1 to the next adjacent standard robot-block part 1, covering and sealing the rotation flange plug connections 2.

Figure 5:
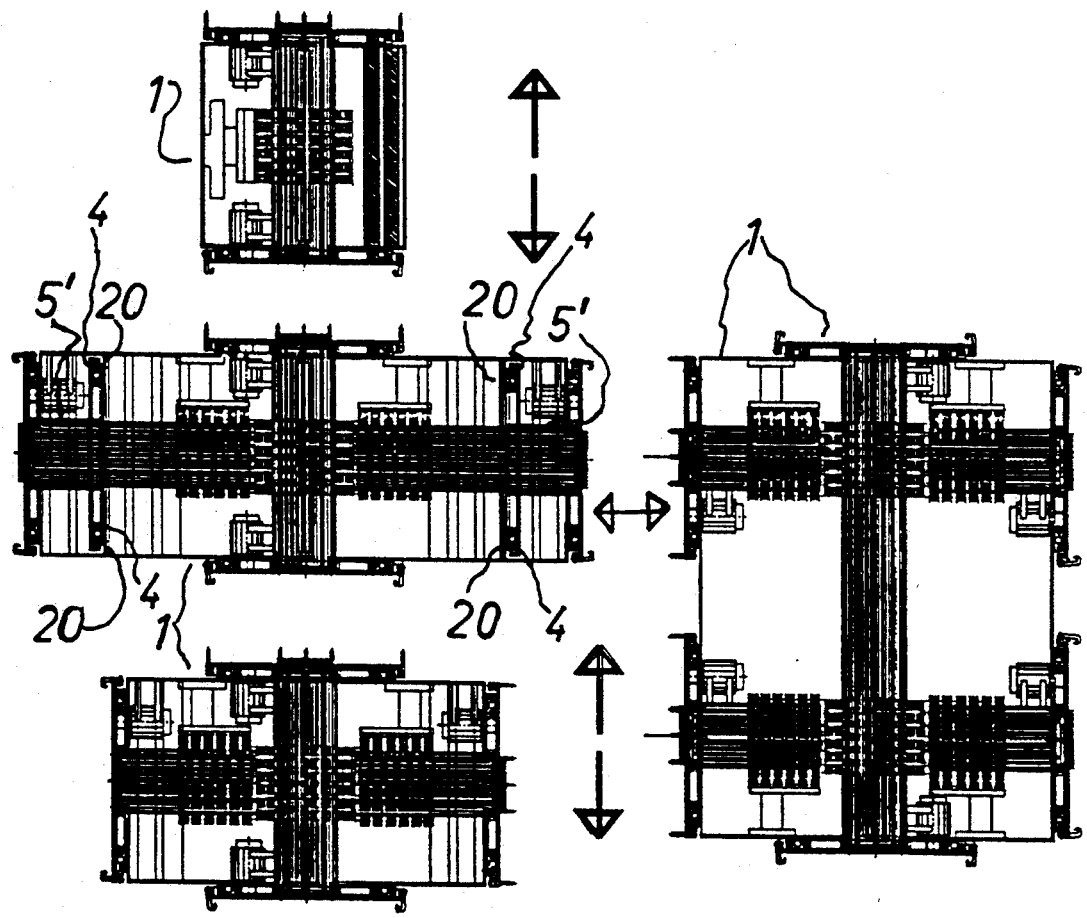
FIG. 5 is a section along the vertical center of four standard robot-block parts before assembling which is achieved in arrow direction of the adjacent rotation-flange plug connections.

The standard robot-block parts 1, shown in FIG. 5, are in an aligned position to be pluged in arrow direction. The standard robot-block part 1 in central position receives a supplementary turntable 4 for the support of the long streching, left and right sided, horizontal and vertical current and communication channels 3 and as such, for the entire horizontal rotation flange plug connection 2, in addition to the turntable 4 inside the rotation plug connection 2. Thus, these long streching standard robot-block parts 1 are provided with a two-point rotational support. The supplementary turntables 4 are inserted with a complete rotation flange and are screwed with the ring nuts 5' at the outer walls of the current and communication channels 3. Moreover, the inner and outer ring 4',4" of the supplementary turntable 4 are screwed with rotation flange clamping bolts 7 at the ribbed support 20 of the block chamber 9. Herewith, is attained the same drive condition with an optional drive of the rotation flange plug connections 2 or of the block chamber 9 by a further driving motor 8. If a supplementary driving motor 8 of the supplementary turntable 4 inside the block chamber 9 is provided, whereas the inside ring 4' is screwed at the ribbed support 20 and the far opposed outside ring 4" is screwed at the rotation flange of the rotation flange plug connection 2 or vice versa, a mutual rotation of the rotation flange plug connection 2 with current and communication channel 3 or of the block chamber 9 is achieved, by starting the belonging driving motor 8. Moreover, if the driving motors 8 are synchronised in rotation direction and the inside and outside rings 4',4" are equally screwed wether at the block chamber 9 or at the rotation flange, the torque efficiency is doubled by the synchronised rotation of the driving motors 8 at the outer rotational support of the rotation flange plug connection 2 and at the inside rotational support of the block chamber 9.

Figure 6:
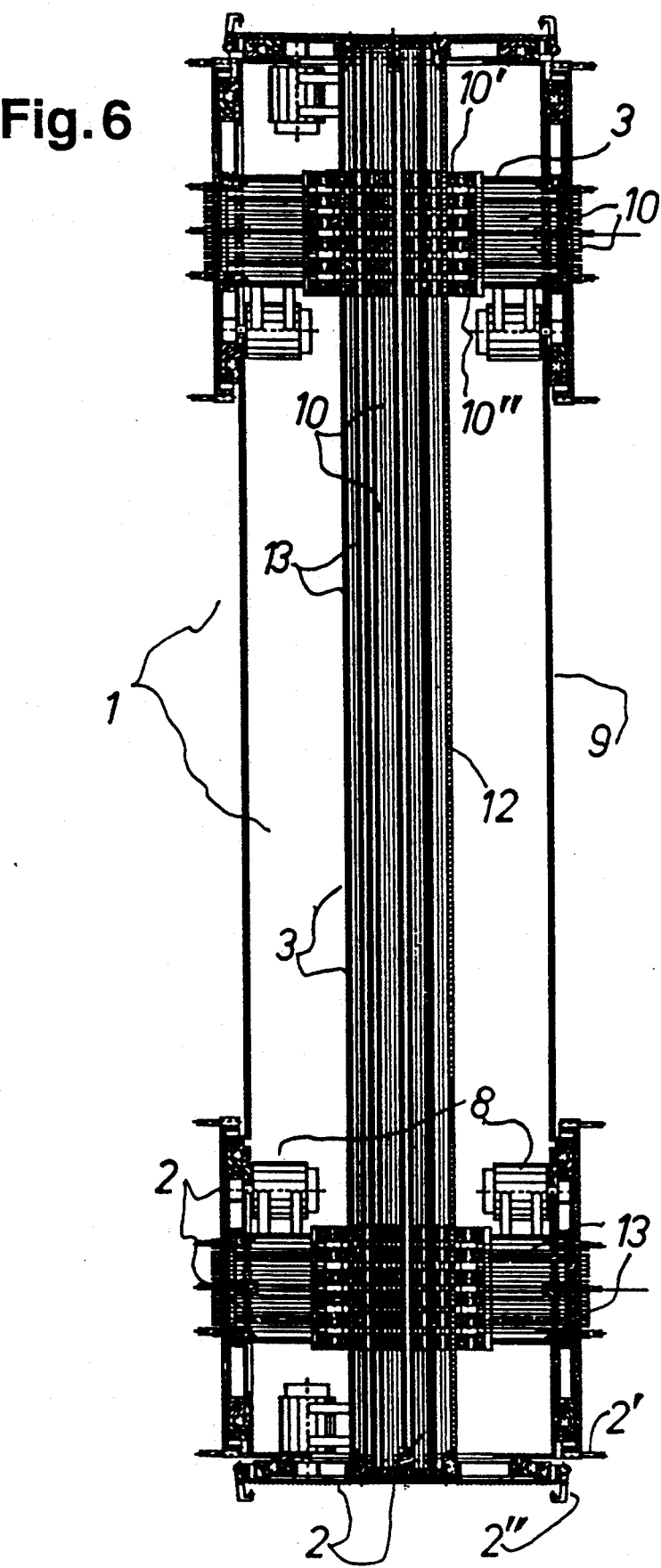
FIG. 6 is a section along the vertical center of a standard robot-block part with two horizontal rotation-flange and four vertical rotation-flange plug connections.

The standard robot-block part 1, shown in FIG. 6, is principally constructed as the standard robot-block-part 4(A). Merely the shape and length dimensions of the block chamber 9 and the inside positioned current and communication channels 2 are different to each other.

Figure 7:
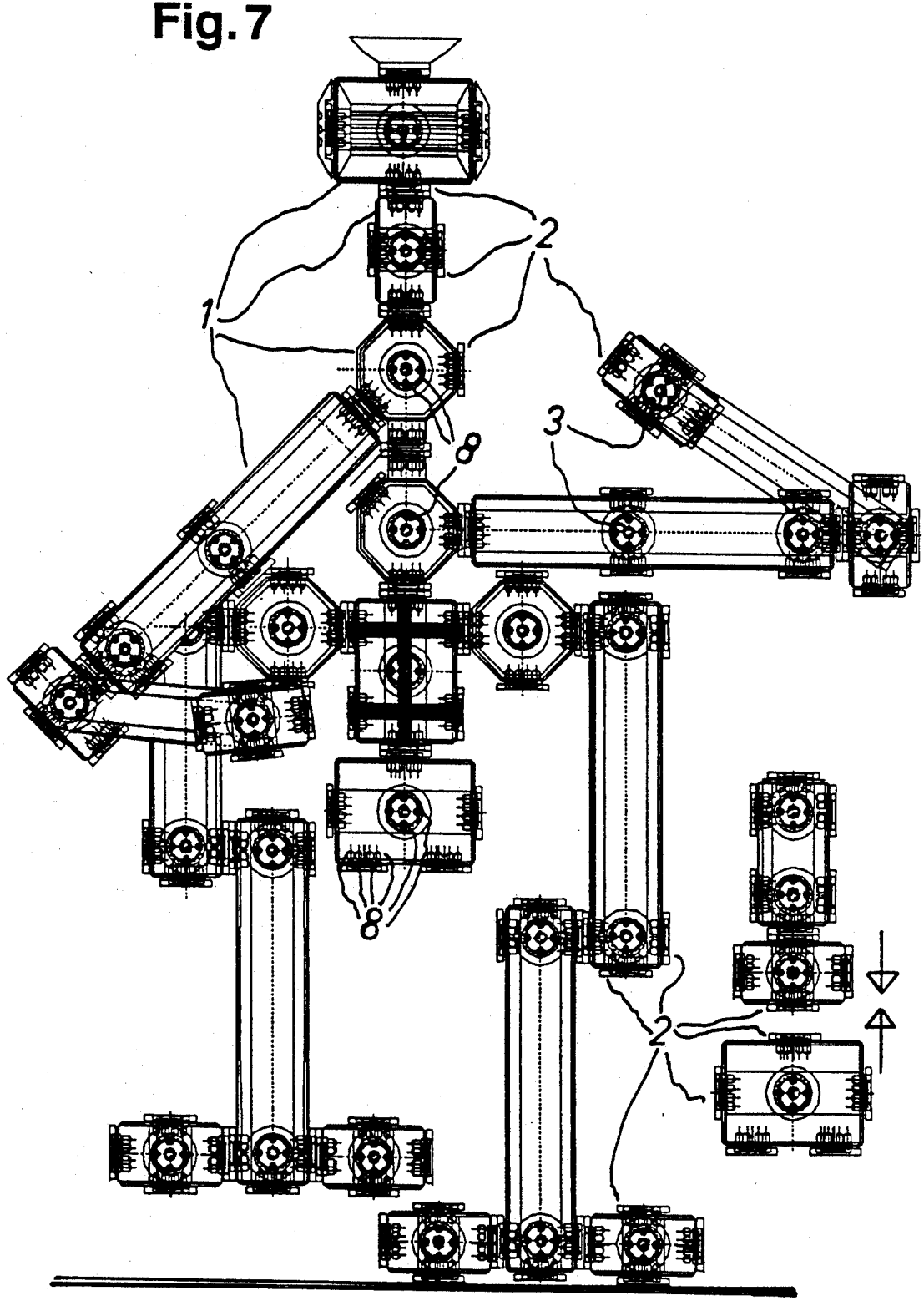
FIG. 7 is a front view of a multi-block robot of standard robot-block parts plug connected for functioning.

The standard robot-block parts 1 of the multiblock-robot, shown in FIG. 7, have four driving motors 8 at each gear ring of the turntable 4 for the enhancement of the torque at each rotation flange plug connection 2 and for reducing the dimensioning and the size of the driving motors 8 of each rotation flange plug connection 2. The standard robot block-parts 1 are partly flanged together with horizontal or vertical rotation flange plug connections 2, equivalent with the flange connection at the top, bottom and side flanges of the rotation flange plug connections 2 which partly encloses an entire rotation of the flange connection positions.

Therefore, for the multiblock-robots, shown in the front view of FIG. 7, some standard robot-block parts 1 are exposed in rotated position with an octagonal top view, in accordance with the direction of the flange connection, at one side of the long stretched side contour. Corresponding to the mounting position and to user intentions, each standard robot-block part 1 is provided with the necessary equipment components 11.

Thus, the standard robot-block part 1 in head position receives head-position equipment components 11 with receiving antenna-equipment for the receiving of remote control impulses and transmission to the standard robot-block part 1, which is positioned under the head-part. This standard robot-block part 1 has equipment components 11 for image recognition and sensors for the position orientation of the multiblock robot. The equipment components 11 of the bottom standard robot-block part 1 in the centerline of the multiblock robot are composed of accumulators for a chargeable current supply of the total system. The standard robot-block part 1 in the hand-manipulation section is equally provided with equipment components 11 for image recognition, composed of infrared sensors, for the secured movements and manipulations of parts. For the multiblock-robot as a closed system, a high number of free motions is attainable. And this only by superimposed rotations which are efficient at the individual rotation flange plug connections 2 and of the optional rotation of the block chamber 9 or of the rotation flange plug connection 2 or of the block chamber 9 with rotation flange connections 2 together in one direction. Thus, the forward rotation up to the center position of the standard robot-block part 1, which is provided as the left arm for manipulation and of the standard robot-block part 1, which is provided as the right arm for manipulations and in parallel position of these both standard robot-block parts 1, which are provided as hand-manipulators, a grip effect is achieved for the access and manipulation of voluminous parts. That means, by the synchronous rotation to each other of the upper, left manipulation arms in a 45° angular position with the directly below positioned manipulation arms in a 90° angular flange position, the grip effect is achieved if at the same time the rotation flange plug connections 2 of the elbow joints, the manipulation forearms and the wrists are rotated horizontally and vertically up to the same height. Likewise, a rotation of the hip-section, in the region of the rotation flange plug connections 2 of the standard robot-block part 1 linked to the upper joints of the bone-section of the adjacent rotation flange plug connections 2 an inclination of the entire upper section together with the manipulation arms is achieved. By means of a rotation of the standard robot parts 1 between the hip-section and the upper bone-section and between the bone-section and the knee-joints a walk effect is achieved. The foot section, as such, is constructed that the center of gravity of the foot-section leads through the foot axis if the multiblock-robot is standing on one foot only as shown at the right foot-section. Also in this position, all other needed motions in the axis of rotation of the other rotation flange plug connections 2 are achieved without limitation, so that, the rotation of the entire upper-parts from the height of the hip-section of the multiblock-robots, generates a weight displacement and a reliable footing position for both foot-sections, as for one foot-section, as also tumble-secured motions, as walk and as walk-direction changements. The tumble-secured motions are controled by the equipment components 11 for the supervision of an always effective stabilizing balance. The central leading of the current and communication supply lines 10 and of the communications and control lines 13, free without junctions through the current and communication channels 3 of a multiblock-robot, achieves the current and communication impuls distribution from each standard robot-block part 1 to each standard robot-block part 1 and at the same time the free, multi-axis rotation within the individual joint positions, at the junction of the rotation flange plug connections 2, from one standard robot-block part 1 to the next or to a multitude of adjacent standard robot-block parts 1.

Figure 8:
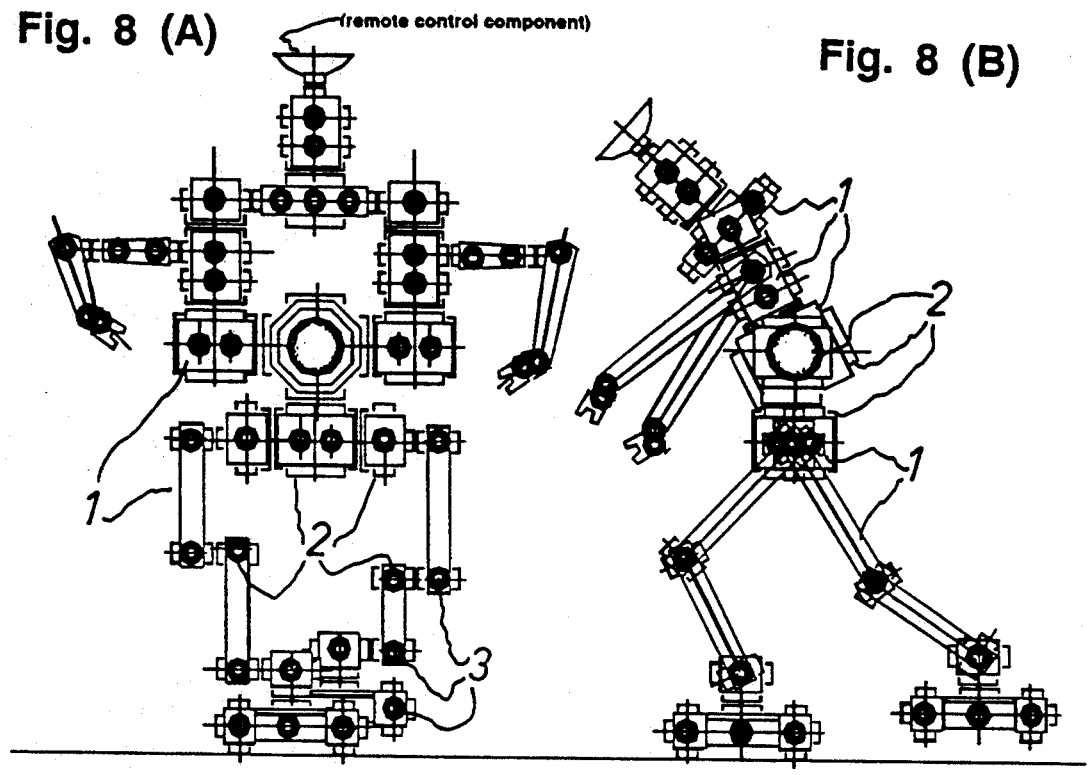
FIG. 8(A) is a front view of a multi-block robot composed of a multitude of standard robot-block parts.
FIG. 8(B) is a motion cycle of the multi-block robot of FIG. 9(A)
FIG. 8(C) is the same multi-block robot as shown in FIG. 8(A), however, with slightly varied built-in equipment.
FIG. 8(D) is a motion cycle of the multi-block robot of FIG. 9(C)

The multiblock-robot, shown in shown in FIG. 8(A), 8(B), 8(C), 8(D), is another solution for the gripping achievement of voluminous parts. Two arm-sections of the standard robot-block parts 1 are flanged, at the same height and not in the center line and not one above the other, with two separated standard robot-block parts 1. The motion cycle for the gripping achievement is otherwise the same and is achieved by the synchronous rotation of the left part at which is flanged the left arm-section and of the right part at which is flanged the right arm-section. A forward inclination for manipulation motions and stability balance is achieved in many joint position. Once in the height of the foot-joints of the standard robot-block parts 2, in knee positions in hip-position and in the neck-position of the standard robot-block part 1 which is here the head-segment with the direction-anntena. Thus, a forward inclination of the multiblock-region below the hip-section can be combined with a backward inclination of the head-segment with synchronous rotations in the foot-joints, so that a harmonic motion cycle of the total multiblock-robot is attained. The multiblock-robot, shown in the upper drawing part of FIG. 8(A), is provided without a rotation flexible flange sealing 18. Furthermore, for the free remaining rotation flanges of the rotation flange plug connections 2 of the standard robot-block parts 1 with a multitude of rotation flange plug connections 2 which are not connected with the rotation flange plug connections of adjacent standard robot-block parts 1, the free rotation flanges are screwed off by the ring nuts 5,5', so that only the plug unit 16 and the plug sleeve unit 17 with its openings of the current and communication channels 3 have to be covered. This cover is achieved by the covering 19 with a reduced diameter by clamping it at the centering and engaging plugs 2' of the plug unit 16, which prodrudes at the current and communication channel 3. For the multiblock-robot, shown in FIG. 8(C), the standard robot-block part 1 in the center position is yet otherwise provided with another equipment. The octagonal standard robot-block part 1 in the center position is exchanged by a rectangular standard robot-block part 1 with equipment components 11 in montitor design and the standard robot-block part 1 below the octagonal standard robot-block part 1, is exchanged by a standard robot-block part 1 in mini-cmputer design with a keyboard which is sliped retractably into the standard robot-block part 1. Furthermore, the standard robot.block parts 1 at the left and right side to the standard robot-block part 1 with octagonal shape in top view, are provided with equipment components 11 composed of a diskette and disk storage unit, so that, this multiblock-robot is autonomously programmable or optionally by the standard robot-block part 1 with equipment components 11 in antenna design with remote control receiver units, or by combined control and programming of equipment components 11 for remote control and for local programming which enclose equipment components 11 for speech control and speech reproduction.

Figure 9:
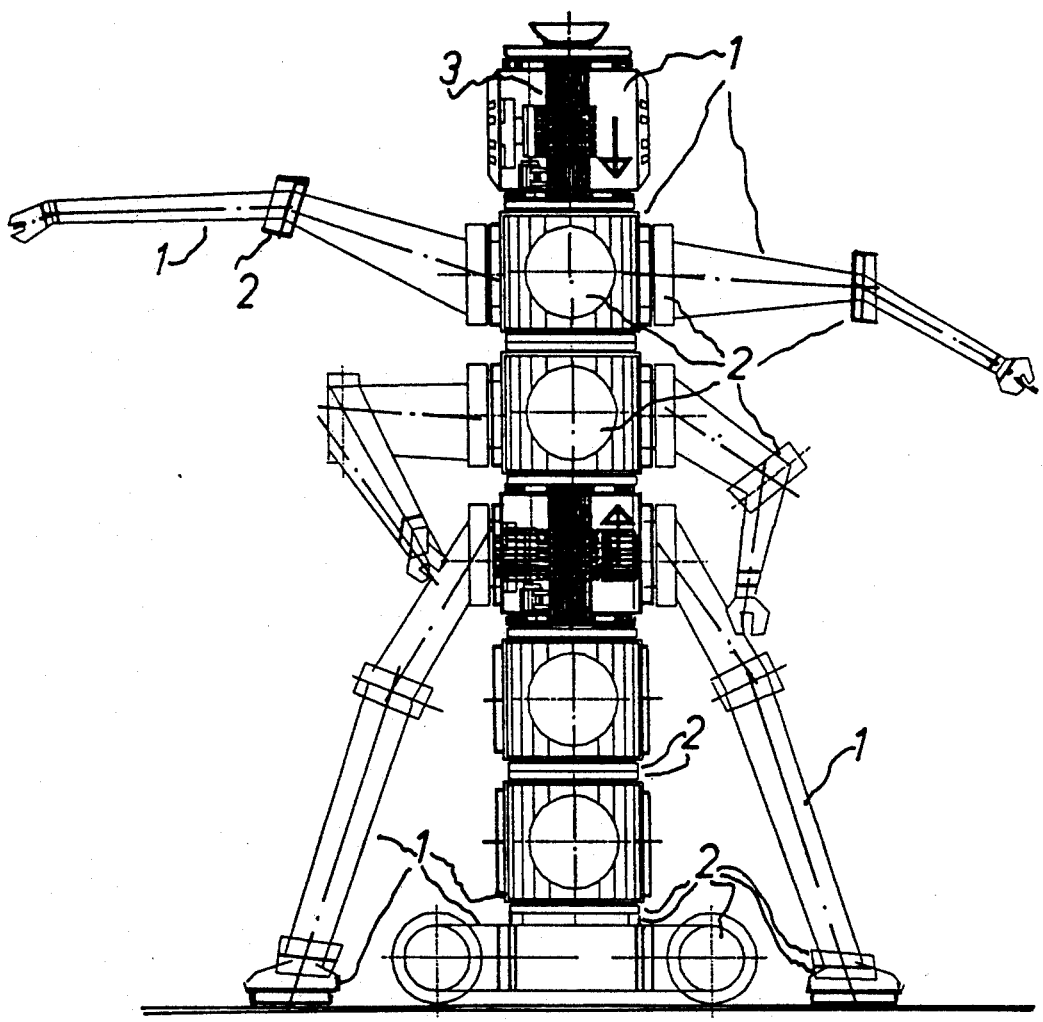
FIG. 9 is a front view of a multi-block robot composed of a multitude of robot-block parts with a section along the vertical center of two standard robot-block parts.

The multiblock-robot, shown in FIG. 9, is a center combination of six cylindrically shaped robot-block parts 1 one above the other, one spherical antenna section at the top side, a rectangular section at the bottom side and with standard robot block parts 1 of one bended shaped boone section, flanged at the hip-region and four standard robot-block parts 1, in accordance with the motion effects of the multiblock-robot, shown in FIG. 4(A). With this tapered shaped four arm design combination is a synchronous gripping effect achieved of the left upper arm-section and of the right under arm-section, by rotation of the both belonging standard robot-block parts 1, plug connected one above the other, in one common axis line. Accordingly, a gripping effect is achieved of these both arm-sections, by the rotation of the right upper arm-section and of the left under arm-section. At the spherical foot-section, additionally to the standard robot-block parts 1 of the foot-segments, a standard robot-block part 1 with four-wheel flanges is provided. Also these parts are driven by the driving motors 8 and the turntables 4. In this case, with the effect of a driving unit for a multiblock-robot, supporting the walk motion of the foot-segments and for enhancing the balance capabilities at manipulation operations as well as an autonomous bottom-drive unit for mechanical operations e.g. in productions, laboratories, or when rotated at 180° of the entire multiblock-robot, overhead, as an autonomous overhead drive-unit for overhead two-rail tracks.

In the case of extensive standard robot-block installations, standard-raster robot-block parts are provided, additionally to the standard robot-block parts 1, shown in the FIGS. 1 and 9, which with its total dimensions equal precisly the multiple of a single-raster robot-block part of individual standard robot-block parts 1. Thus, there is for one solution an optional plug connection in one connection line of many individual standard robot-block parts 1 from the belonging rotation flange plug connection 2 up to many rotation flange plug connections 2 or there is for the same solution only one standard-raster robot-block part with only one rotation flange plug connection 2 in starting-point position and one rotation flange plug connection 2 in end-point position and the block chamber 9 is leaded uninterrupted, continuously from the starting-point to the end-point position, whereas the total dimension from starting-point to the end-point position of the rotation flange plug connections is identical to the manifold, individual standard robot-block part plug connections. In that way, for an installation of individual standard robot-block parts 1, or of standard-raster robot-block parts, or of combined individual and standard raster robot-block parts one behind the other, the rotation plug connections 2 are always in identical raster-dimension position. Furthermore, standard robot-block parts are provided of an angular design without a turntable 4 in the direction changing angular position, but with a block chamber 9 which is continuously shaped and the current and communication channels 3 are leaded to the angular position as if the direction changing has been achieved by a rotation flange plug connection 2 and the plug connection-raster dimension from the rotation flange plug connection 2 of the starting-position up to the rotation flange plug connection 2 in end-position is always precisly identical with the plug connection-raster dimension of an installation with straight-lined standard robot-block parts 1. Furthermore, standard robot-block parts 1 are provided which are different at the outer contour of the block chamber 9. There are standard robot-block parts 1 of a ploynomial, spherical, cylindrical bended, tapered shape, of different diameter and most different design, whereas the plug connection standard-raster dimension of a rotation flange plug connection in starting-point position up to a rotation flange plug connection in end-point position is always achieved, so that standard robot-block parts 1 of the most different outer contour are always identical in its plug connection raster-dimensions for plug connection in every optical position. The rotation flange plug connections 2 of the standard robot-block parts 1 with a multitude of rotation flange-plug connections 2 are provided with different diameters and dimensions, so that a transition is achieved of each rotation flange plug connection 2 to a multitude of rotation flange plug connections 2 with different diameter and dimensions of the same standard robot-block part 1.

Furthermore, for automatic objectives and processes in productions and transfer streets, standard robot-block parts 1 of nearly the similar design are installed in long streched, horizontal and vertical networks, over great distances, operating as self operating multiblock-robot automatic-lines. These are combined with self operating multiblock-robots with walk, drive and manipulating faculties, composed out of nearly the same standard robot-block parts 1, so that a compatibility exists between the multiblock-robot parts 1 in self operating multiblock-robot automatic-lines and the self operating robots with walk, drive and manipulating faculties, achieving, that the standard robot-block parts 1 in each of the user applications are exchangeable at will in varied combinations. For these user applications, the standard robot-block parts 1 are provided with equipment components 11 for the mains supply from the public network. These standard robot-block parts 1 are flanged in needed distances between the continuously, horizontally and vertically, one behind the other flanged standard robot-block parts 1, for the power supply of the multiblock-robot automatic-lines.

It will be understood that each of the elements described above, or two or more together, may also find a useful application in other types of systems differing from the types described above.

While the invention has been illustrated and described as embodiment of a multiblock-robot, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, form the standpoint of prior art, fairly constitute essential charackteristics of the generic or specific aspects of this invention.

I claim:

1. A robot system with robot-specific effects, said robot system comprising:
   various standard robot-block-parts consisting of a block chamber with a plurality of rotation-flange plug connections,
   said rotation-flange plug connections disposed in vertical direction and forming a vertical pivot axis,
   said rotation-flange plug connections disposed in horizontal direction and forming a horizontal pivot axis,
   said rotation-flange plug connections provided with dimension fitting flanges and engaging plugs and with spring-loaded clamp levers all intersecting between said rotation-flange plug connections input and output ends,
   said rotation-flange plug connections having a turntable with driving motors and current and communication channels for current, supply, control and communcation conducters in the center axis of said robot-block parts,
   said current and communication channels provided with inner and outer slip-rings and induction units and with plug units at each end of said current and communication channels consisting of plug connections and plug sleeves,
   said robot-block parts having inside of said block chamber built-in equipment composed of accumulators, sensors, electronic boards, said current, supply, control and communication conducters guiding from said plug units through said inner and outer slip ring and induction units to each of said rotation-flange plug connections, to said driving motors, and to said built-in equipment, said rotation-flange plug connections with said current and communication channels being rotatable relative to said center axis by means of said driving motors whereas said block chamber being in rest position, said rotation-flange plug connections with said current and communication channels being in rest position and said block chamber being rotatable relative to said center axis by means of said driving motors, said rotation-flange plug connections with said current and communication channels together with said block chambers being rotatable by means of each of said rotation flange plug connections of said standard robot-block parts adjacently interconnected, said rotation-flange plug connections with said current and communication channels of said standard robot-block parts being rotatable by means of said adjacently interconnected standard robot-block parts whereas said block chamber being in rest position, said standard robot-block-parts flanged together by means of the centering effect of said engaging plugs, the clamping effect of said spring-loaded clamp levers, the contact closing between said plug connection units and said plug sleeve units of said rotation flange plug connections and forming a multi-block robot with a multitude of various heads, arms, hips, legs and feet, said multi-block robot provided for various manipulations and locomotions with multi-axis free-motion efficiency, by means of said turntables and the rotary power of said driving motors, said multi-block robot provided for self sufficient operations supplied and controlled by means of said current and communication channels and of said said built-in equipment in each of said chambers of said standard robot-block parts.

2. A robot system with robot-specific effects as claimed in claim 1, comprising:

sealings between the rotation flange plug connections of said adjacent standard robot-block parts by a rotation flexible pleated covering which is screwed at the block chamber and bridges from one of said standard robot-block part to the next adjacent standard robot-block part covering and sealing said rotation flange plug connections;

access openings with rotary flaps outside of said block chambers for maintanance purposes and for access to said built-in equipment, to said driving motors and to said current and communication channels inside of said block chambers.

3. A robot system with robot-specific effects as claimed in claim 1, comprising:

dimension fitting standard raster robot-block parts for extensive standard robot-block installations with precisly a multiple of the dimension of said standard robot block-parts, said standard raster robot-block parts mutually exchangable with said standard robot-block parts in one extensive assembly line and said raster standard robot-block parts having said rotation flange plug connections precisely in equal position as a plurality of said standard robot-block parts flanged together for obtaining said dimension fitting raster of said standard raster robot-block parts.

4. A robot system as claimed in claim 3, comprising:

said standard robot-block parts with an angular design without a turntable in the direction changing angular position, but with said block chamber continuously shaped and said current and communication channels leading to said angular position as if the direction changing has been achieved by means of said rotation flange plug connections;

said dimension fitting raster of said rotation flange plug connections with said angular design from starting-position up to the end-position being always precisely identical with said dimension fitting raster of an installation with straight-lined standard robot-block parts.

5. A robot system as claimed in claim 3, comprising:

said block chamber of said standard robot-block parts with varied design as of a ploynomial, spherical, cylindrical, bended, tapered shape, with different diameter and most different contour;

said dimension fitting raster from said starting position up to said end position of said standard robot-block parts with said block chamber of varied design being always mutually precisely identical with said dimension fitting raster for rotation flange plug connections of said standard robot-block parts.

6. A robot system as claimed in claim 3, comprising:

said standard robot-block parts with a multitude of said rotation flange plug connections with different diameters and dimensions being rotation flange plug connections compatible to each other, thereby a transition being attainable from each of said rotation flange plug connections to a multitude of said rotation flange plug connections with different diameters and dimensions of said standard robot-block parts.

7. A robot system as claimed in claim 1, comprising:

said standard robot-block parts for said multiblock robots having inside of said block chamber said built-in equipment composed of local control and remote control components, said built-in equipment components for local control consisting of sensors for image recognition and position orientation, a monitor, a minicomputer with a retractable keyboard, discette and disc storage unit, a speech control and a speech reproduction mudule, said built-in equipment components for remote control consisting of an antenna for receiving and transmitting of remote control impulses to said sensors for image recognition and position orientation and to said minicomputer, thereby, local control, remote control and programming of said multi-block robots beining atainable by a combination of said standard robot-block parts with said built-in components for local control and remote control.

8. A robot system as claimed in claim 1, comprising:

said standard robot-block parts of nearly the same design, installed in long streched horizontal and vertical networks, over great distances, operating as self sufficient multiblock-robot automatic-lines and being compatible and exchangeable in varied combinations with said standard robot-block parts for said self operating multi block-robots with walk, drive and manipulating faculties;

equipment components for constant power supply provided in said block chambers for said standard robot-block parts in said multiblock robots and said networks.

* * * * *